(12) United States Patent
Shih (10) Patent No.: US 6,217,475 B1
(45) Date of Patent: Apr. 17, 2001

(54) DUAL MASS VARIABLE INERTIA FLYWHEEL ASSEMBLY

(75) Inventor: Shan Shih, Troy, MI (US)

(73) Assignee: ZF Meritor, Laurinburg, NC (US)

( * ) Notice: Subject to any disclaimer, the term of this patent is extended or adjusted under 35 U.S.C. 154(b) by 0 days.

(21) Appl. No.: 09/433,917

(22) Filed: Nov. 3, 1999

(51) Int. Cl.[7] .................................................. F16H 3/44
(52) U.S. Cl. .................................................. 475/269
(58) Field of Search ................................. 475/207, 208

(56) References Cited

U.S. PATENT DOCUMENTS

| 4,403,526 | 9/1983 | Numazawa et al. . |
|---|---|---|
| 4,462,274 | 7/1984 | Reppert et al. . |
| 4,872,375 | 10/1989 | Trachman et al. . |
| 4,919,010 | 4/1990 | Trachman et al. . |
| 4,955,851 | 9/1990 | Arzoian et al. . |
| 5,526,709 | 6/1996 | Thomas et al. . |
| 5,569,108 | * 10/1996 | Cadee et al. .............................. 475/1 |
| 5,591,097 | 1/1997 | Petri et al. . |
| 5,846,153 | * 12/1998 | Matsuoka ............................. 475/269 |
| 6,035,734 | 3/2000 | Le Van . |

* cited by examiner

*Primary Examiner*—Dirk Wright
(74) *Attorney, Agent, or Firm*—Carlson, Gaskey & Olds (57) ABSTRACT

A vehicle driveline system includes a planetary gear arrangement that cooperates with a flywheel member to provide a dual mass variable inertia flywheel assembly. The planetary gear arrangement preferably includes an automated actuator that selectively engages different portions of the planetary gear arrangement to provide at least two operating positions that each have an associated effective mass and a corresponding moment of inertia. Choosing an operating position selectively controls the inertia of the flywheel assembly and greatly reduces or eliminates torsional vibrations that may otherwise occur. The first and second operating positions also provide high and low range transmission operation, respectively.

19 Claims, 4 Drawing Sheets

DUAL MASS VARIABLE INERTIA FLYWHEEL ASSEMBLY

BACKGROUND OF THE INVENTION

This invention generally relates to flywheels used in vehicle drivelines. More particularly, this invention relates to a flywheel assembly that has a selectively variable moment of inertia that controls torsional vibrations in a vehicle driveline.

Vehicle drivetrains or drivelines typically include an engine with a rotating output shaft. A flywheel rotates with the output shaft to provide a rotating driving force to an input shaft on a transmission gear box. The transmission gear box provides a desired gear ratio to a transmission output shaft to drive the wheels of the vehicle. Most driveline assemblies include a clutch for selectively coupling the driving torque from the engine to the transmission. Along with the clutch a torsional damper is typically included to decrease torsional vibration along the drivetrain.

One feature that has long been desired is a dual mass flywheel that is capable of reducing the amount of torsional vibration along the drivetrain. Many difficulties have been encountered when attempting to design such a dual mass flywheel. Most, if not all, dual mass flywheel arrangements that have been proposed to date have proven unsuccessful or, at best, of limited value.

Additionally, it is very desirable to provide a flywheel arrangement that has a variable inertia to compensate for vibrations in the vehicle drivetrain. Prior to this invention, no one has proposed an arrangement where a variable inertia flywheel compensates for such circumstances.

This invention provides a unique dual mass arrangement with a variable inertia so that torsional vibrations along the vehicle drivetrain are effectively eliminated. Additionally, this invention provides an arrangement that enhances vehicle performance such as acceleration and fuel economy.

SUMMARY OF THE INVENTION

In general terms, this invention is a dual mass, variable inertia vehicle flywheel assembly. A flywheel member is adapted to be moved by a rotating engine output member such as an engine output shaft. A planetary gear arrangement cooperates with the flywheel member to provide a variable moment of inertia. The planetary gear arrangement is selectively moved into a first operative position where selected portions of the planetary gear arrangement rotate with the flywheel member. In this first operative position, a first moment of inertia exists. The planetary gear arrangement also is selectively moved into a second operative position where selected portions of the planetary gear arrangement rotate with the flywheel member. In this second operative position, a second moment of inertia exists.

Having the planetary gear arrangement components rotate with the flywheel member provides a dual mass flywheel assembly. The inventive arrangement provides excellent torsional vibration control. A vibration damper preferably is between the flywheel member and the planetary gear arrangement.

By selecting which of the components of the planetary gear arrangement rotate with the flywheel as driving torque is provided to the vehicle transmission, the moment of inertia of the flywheel assembly is varied. This allows a lower moment of inertia at vehicle start-up and in the lower range of gears, such as first through fifth gears. A second, higher moment of inertia is provided by controlling the operation of the planetary gear arrangement when higher gear ratios, such as sixth through tenth, are chosen.

A system designed according to this invention provides a dual mass flywheel assembly that has a variable moment of inertia because a different effective mass is rotated depending upon the operating position of the planetary gear arrangement. Moreover, varying the moment of inertia of the flywheel arrangement is effective for eliminating torsional vibrations along the drivetrain components, especially when gear ratios are selected that correspond to the natural resonant frequency of the drivetrain.

The various features and advantages of this invention will become apparent to those skilled in the art from the following detailed description of the currently preferred embodiment. The drawings that accompany the detailed description can be briefly described as follows.

DETAILED DESCRIPTION OF A PREFERRED EMBODIMENT

Figure 1:
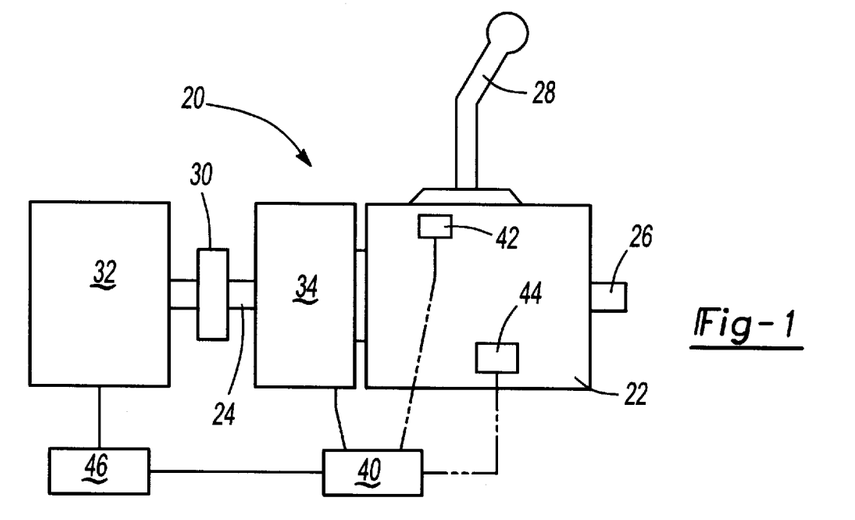
FIG. 1 schematically illustrates a vehicle driveline system designed according to this invention.

FIG. 1 schematically illustrates a vehicle driveline system 20. A main gear box 22 includes a plurality of gear members as known in the art for providing a plurality of gear ratios between a transmission input shaft 24 and a transmission output shaft 26. A shift member 28 is moveable to manually select one of the plurality of gear ratios within the main gear box 22. The shift member 28 can be a manual stick shift that allows a driver to manually engage the different gear members to achieve a desired gear ratio. Alternatively, a system designed according to this invention includes a shift member 28 that is a shift lever that is selectively moveable by a driver to generate an electrical signal that indicates a desire to shift gears. An automatic transmission system is also within the scope of this invention.

A rotary output 30 of an engine 32 such as a conventional output shaft 31 and a flywheel member 33, provides a driving force (i.e., torque) to the transmission input shaft 24. In the illustrated example, the transmission input shaft 24 is directly coupled to the rotating engine output 30 without using a traditional clutch. Using a system designed according to this invention allows the traditional clutch to be eliminated.

The vehicle driveline system 20 includes a planetary gear arrangement 34 that serves several purposes. The planetary gear arrangement 34 cooperates with the flywheel member 33 to provide a variable inertia flywheel assembly. The planetary gear arrangement 34 also effectively operates as a combined clutch and range gear box. The planetary gear arrangement 34 selectively provides two different effective masses or moments of inertia and two different gear reduction ratios between the transmission input shaft 24 and the gear members within the main gear box 22. The planetary gear arrangement 34 preferably also operates to uncouple the transmission input shaft 24 from the transmission output shaft 26. The cooperation between the flywheel member 33 and the planetary gear arrangement 34 provides a dual mass, variable inertia flywheel assembly that controls torsional vibrations in the driveline. Moving the planetary gear arrangement into a first operating position results in selected components of the planetary gear arrangement rotating with the flywheel member 33. This provides a first effective mass for the flywheel assembly. Moving the planetary gear arrangement 34 into a second operating position such that a different number of components of that arrangement rotate with the flywheel member 33, provides a second rotating effective mass with a second moment of inertia. The moment of inertia of the flywheel assembly is controlled by selectively moving the planetary gear arrangement 34 between the first and second operating positions.

The following description focuses on examples where two operating positions of the planetary gear arrangement are utilized. It is within the scope of this invention to utilize more than two operating positions for the planetary gear arrangement and, given this description, those skilled in the art will realize the benefits or uses for such arrangements.

The planetary gear arrangement 34 and the flywheel member 33 preferably are designed such that in the second operating position when the high range of gears of the transmission is selected, there is a one-to-one correspondence in the moment of inertia on both sides of a torsional damper that is between the flywheel member 33 and the planetary gear arrangement 34. This one-to-one correspondence is believed to be most needed when the sixth, seventh and eighth gears are engaged because it is those gear ratios in which the driveline system is closest to resonance. When utilizing a variable inertia flywheel assembly designed according to this invention, the natural frequency of the driveline components is greatly reduced.

Before describing the preferred operation of the planetary gear arrangement 34, it is useful to consider the intended results of the dual mass, variable inertia flywheel assembly of this invention. The goal is to distribute the mass that is rotated as part of the vehicle driveline 20 to control torsional vibrations and the moment of inertia. With the inventive system, the torsional vibrations associated with the natural frequency of the vehicle drivetrain are reduced.

One specific object of this invention is to minimize the moment of inertia in the lower gears. At vehicle start-up, for example, a lower moment of inertia allows for faster acceleration of the vehicle. This not only results in better vehicle performance from a driver's perspective, but also provides greater fuel efficiency.

An additional benefit provided by a system designed according to this invention is that the overall weight of the driveline can be reduced. Reducing the moment of inertia, especially at the lower gears, allows for making the flywheel member 33 smaller than conventional flywheel members. In one example, the approximate weight of the flywheel member 33 is one-half that of a conventional flywheel. Given this description, those skilled in the art will be able to choose the appropriate component sizes and configurations to achieve the results that are described in this specification. Factors such as the size or power of the engine and the amount of torque needed in the driveline are among those that will be considered when choosing the appropriate design of the individual components.

The following description gives schematic illustrations of arrangements that achieve the results provided by this invention. This description not only explains the torsional vibration control and the variable inertia effect of the arrangement designed according to this invention, but also considers the benefits provided by allowing the planetary gear arrangement 34 to serve as a combined range gear box and clutch. The combined range gear box and clutch functions of a planetary gear arrangement such as used with this invention are also described in the co-pending U.S. application having Ser. No. 09/411735 filed on Oct. 1, 1999. The teachings of that application are incorporated into this specification by reference.

The system 20 includes an electronic controller 40, which can be realized through a conventional microcomputer, for example. The controller 40 is operative to control the planetary gear arrangement 34 to achieve the different operating positions.

The controller 40 preferably also communicates with a sensor arrangement 42 that indicates movement of the shift member 28. The controller preferably also communicates with a conventional sensor arrangement 44 that utilizes positions of selected components within the main gear box 22 in a known manner to indicate a currently engaged gear ratio. The information from the sensor arrangements 42 and 44 preferably is used by the controller 40 to control the operation of the planetary gear arrangement 34 so that the transmission and driveline operates as desired.

Additionally, an engine controller 46, which is known in the art, preferably communicates with the controller 40 to provide information regarding the engine speed, for example.

Figure 2:
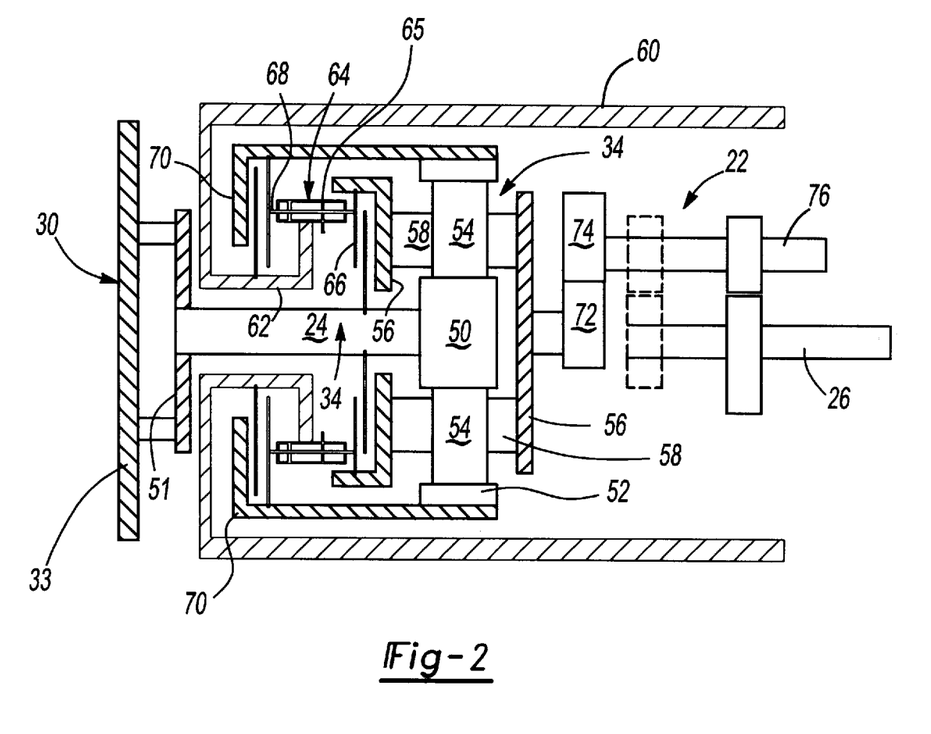
FIG. 2 schematically illustrates a first embodiment of this invention.

FIG. 2 schematically illustrates a first example of the driveline system 20 designed according to this invention. In this embodiment, the planetary gear arrangement 34 includes a sun gear 50 that is fixed to rotate with the transmission input shaft 24. A torsional damper 51 preferably is provided to couple the engine output member 30 with the transmission input shaft 24. The torsional damper 51 may take any one of several forms but most preferably is positioned between the flywheel member 33 and the planetary gear arrangement 34. One example torsional damper includes a portion that is fixed to rotate with the flywheel member 33 and another portion that is damped and rotates with the input shaft to the planetary gear arrangement 34.

Since the sun gear 50 rotates with the input shaft 24 in the example of FIG. 2, the sun gear 50 can be referred to as the input member of the planetary gear arrangement 34. A ring gear 52 surrounds the sun gear 50. A plurality of pinion gears 54 are intermeshed ring gear 52 and the sun gear 50. A carrier member 56 is associated with pinion gears 54 so that each pinion gear 54 can rotate about its own axis 58 relative to the carrier member 56 and the carrier member 56 can rotate with the pinion gear members 54 about the sun gear 50.

The system 20 preferably includes a single housing 60 that houses the main gear box 22 and the planetary gear arrangement 34. In the illustrated example, the housing 60 includes a support portion 62 that supports an automated actuator or an engaging member assembly 64. In the preferred arrangement, the automated actuator 64 includes a hydraulically actuated piston 65 for selectively moving wet clutches 66 and 68 into and out of engagement, depending upon the desired operation of the system. Alternatives to a hydraulic actuator include pneumatic and electric powered devices. The positions of the clutches 66 and 68 in the example shown in FIG. 2 are interdependent such that when the clutch 68 is engaged, the clutch 66 is, not engaged and vice versa. The automated actuator 64 also provides a position where neither of the clutches 66 or 68 are engaged. When neither clutch is engaged, the transmission input shaft 24 is uncoupled from the output shaft 26, such that no appreciable torque is transmitted to the main gear box portion 22.

The carrier member 56 preferably is associated with a main gear box input gear 72 so that driving torque can be selectively transmitted from the engine output member 30 and the transmission input shaft 24 to the gear members within the main gear box 22. Example gear members are shown such as the main gear box input gear 72 and a countershaft gear 74, which rotates with a counter shaft 76 as known in the art. The selected gear arrangement provides the desired gear ratio so that the transmission output shaft 26 drives the wheels of the vehicle (not illustrated) as needed.

The actuator 64 preferably is automated and controlled by the electronic controller 40. It is also possible to have manual actuation, however, automated movement is preferred to simplify the task of driving the vehicle. In one example, the actuator 64 is automated and the driver can operate a clutch pedal (not illustrated) in the event manual actuation of the arrangement 34 is desired to open the connection between the engine output 30 and the main gear box.

The engagement member 64 moves the clutches 66 and 68 into different positions to provide the desired operation of the system 20. Whenever the transmission should be in neutral, at vehicle start up for example, the engaging member assembly 64 does not engage either clutch 66 or 68. In this condition, the sun gear and transmission input shaft rotate at the same speed as the engine output 30. Since the ring gear 52 and the carrier member 56 are free to rotate (i.e., are not driven by the sun gear), no appreciable torque is transmitted from the carrier member 56 to the main gear box input gear 72. In this position, the planetary gear arrangement 34 effectively uncouples the transmission input shaft 24 from the transmission output shaft 26.

This condition typically was achieved in a manual transmission by opening a clutch by manual operation of a clutch pedal, for example. With this invention, no separate clutch is required (i.e., the clutch function is integrated into the transmission system) and the driver need not be concerned with that portion of the operation of the transmission system. Of course, there may be circumstances where manual input (i.e., manual actuation) to the engaging member assembly 64 is useful and the system 20 can be designed to accommodate such circumstances.

When it is desirable to operate the vehicle transmission in a low range (i.e. first through fifth gears), the engaging member assembly 64 moves the clutch 68 into engagement. The extension 70 on the ring gear 52 and the arrangement of the support portion 62 allows the clutch 68 to effectively ground the ring gear 52 to the housing 60. When the clutch 68 is engaged, the ring gear 52 is not permitted to rotate. In this position, a first gear reduction ratio is provided between the transmission input shaft 24 and the main gear box 22. The pinion gears 54 and the carrier member 56 rotate about the sun gear 50 and provide a first gear reduction ratio that is selected by the design of the pinion gears 54, the ring gear 52 and the sun gear 50, respectively. In one example, the first gear reduction ratio provides a torque multiplication factor of three. In this position, the transmission main gear box 22 operates in a low range.

In the first operating position, the planetary gear arrangement 34 provides a first effective mass that rotates with the flywheel member 33. Accordingly, the dual mass flywheel assembly has a first moment of inertia when the planetary gear arrangement 34 is in the first operating position. This is especially useful at vehicle start-up and when the lower range of gears are required. In one example, the inertia of the flywheel assembly is one-half that of a conventional flywheel. Reducing the flywheel inertia by approximately 50% to 18 inlbs$^2$ is equivalent to reducing the class 8 GCW by approximately 45,000 lbs. at start-up when the transmission low gear ratio is 13 and the axle ratio is 4.

Additionally, when the planetary gear arrangement 34 is in the first operating position during the engine cranking phase, vibration to the powertrain components is effectively eliminated. In conventional arrangements having dual mass flywheels with torsional dampers large vibrations in the powertrain components typically occur during the engine cranking phase. The system designed according to this invention eliminates that problem, which provides for better durability in the vehicle driveline system 20.

Since the first operating condition includes having the ring gear 52 grounded, only the sun gear, pinion gears and the carrier member are rotated. With these components rotating, a first effective mass is provided by the planetary gear arrangement 34. This first effective mass provides the first moment of inertia for the dual mass flywheel assembly.

Each time that a driver wants to make a shift in the main gear box 22, the controller 40 preferably operates the automated actuator 64 to open the clutch 68 momentarily to interrupt the torque transfer and to allow the gear members within the main gear box to be disengaged and then re-engaged into a desired gear ratio. The controller 40 preferably gathers information from the sensor arrangement 42, which indicates a movement of the shift member 28. In situations where a shift lever that generates electrical signals indicating a desired shift is present, the sensor arrangement 42 may be included as a redundancy and the controller 40 can receive and interpret the signals from the shift lever indicating a desired shift as a signal for when to move the planetary gear arrangement into the position that uncouples the transmission input shaft 24 from the output shaft 26.

Upon determining that the appropriate gear members in the main gear box 22 are engaged to achieve the desired gear ratio, the controller 40 preferably causes the automated actuator 64 to move the clutch 68 back into an engaged position so that the vehicle can be driven with the transmission in the desired gear ratio.

Once a shift from the low gear range into the high gear range is desired, (such as shifting from fifth to sixth gear) the automated actuator 64 engages the clutch 66 rather than the clutch 68. In the illustrated embodiment, engaging the clutch 66 effectively couples the carrier member directly to the transmission input shaft 24 and the sun gear 50 so that the carrier member 56 is locked to rotate in unison with the input shaft 24. In this position, a direct drive from the engine to the main gear box input gear 72 is achieved. This provides a high range of operation because the gear members within the main gear box 22 can be used for a "second set " of high range gear ratios. Whenever a shift is desired, the automated actuator 64 momentarily opens the clutch 66 so that the gear members can be selectively moved within the main gear box 22 to achieve a desired gear ratio. The clutch 66 is then engaged to continue driving the vehicle.

In the second operating condition, the planetary gear arrangement 34 provides a second moment of inertia for the flywheel assembly. Since the ring gear 52 now rotates in unison with the sun gear 50 and the carrier member 54, a second effective mass is rotating with the flywheel member 33. With this second effective mass, comes a second moment of inertia for the flywheel assembly. Selecting which of the components of the planetary gear arrangement 34 rotate with the flywheel member 33 controls the moment of inertia of the flywheel assembly.

Utilizing the second operating position and the second moment of inertia provides the significant advantage of reducing the harmonics in the driveline system components at gears that otherwise would experience torsional vibration at the natural frequency of the system. Most often, the natural frequency of the system occurs at the sixth, seventh and eighth gears. A system designed according to this invention results in the natural frequency being much lower when the planetary gear arrangement 34 is placed into the second operating position. Reducing the torsional vibrations along the powertrain renders the system more robust and eliminates the need for complicated torsional damper components. Additionally, a system designed according to this invention reduces the incidence of what is known as idle gear rattle or coasting gear rattle.

Given this description, those skilled in the art will be able to choose from among commercially available components or to design appropriate components to achieve a system including this invention that appropriately yields the desired results for a particular vehicle. Similarly, with the benefit of this description, skilled individuals can select from available microprocessors, or to design dedicated circuitry, for example, to realize a controller 40 that operates as described in this text. Similarly, given this description, skilled individuals will be able to program a controller to accomplish the results mentioned in this description.

FIG. 2 illustrates one example of a planetary gear set combined with a main transmission gear box. Other variations are possible where different forms of engaging members are used and different operation of the various planetary gear members are used to achieve the different moments of inertia and the different gear reduction ratios.

Figure 3:
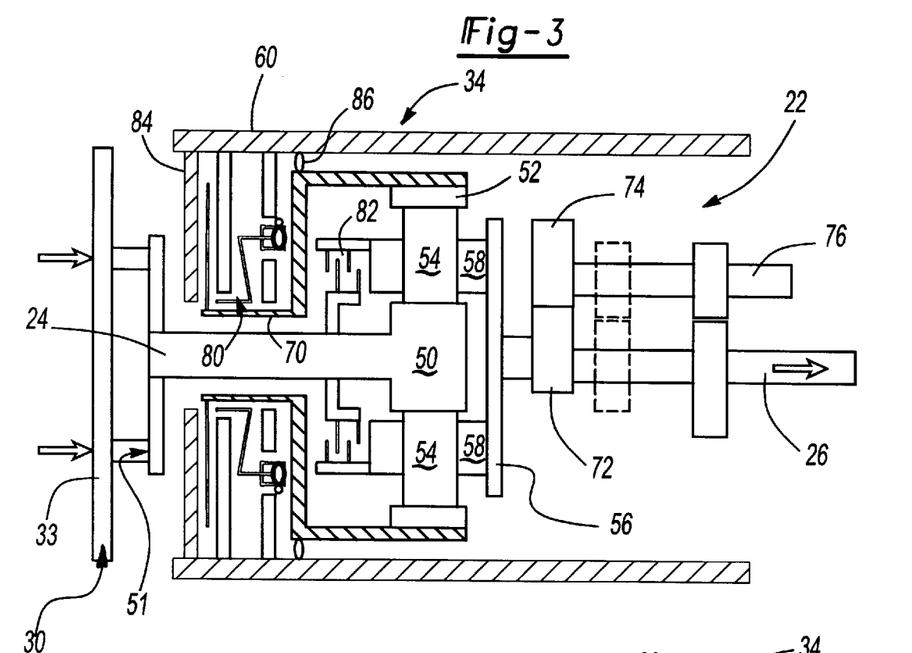
FIG. 3 illustrates a second embodiment of this invention.

FIG. 3 shows another example transmission arrangement where separate engaging members 80 and 82 are provided for achieving the different gear reduction ratios. In this arrangement, the engaging member 80 is a dry clutch. The extension 70 is modified compared to that shown in FIG. 2. Additionally, a housing portion 84 provides the ability to ground the ring gear 52 to the housing 60. Since the engaging member 80 is a dry clutch, an oil ring 86 preferably is provided to seal off the transmission lubricants from the dry clutch.

A dry clutch may be desired as an actuator in the planetary gear arrangement 34 because dry clutches tend to be more compact and provide a higher coefficient of friction compared to wet clutches.

The other engaging member 82 in the example illustrated in FIG. 3 is a wet clutch. The controller 40 preferably controls the engaging members 80 and 82 as needed to achieve the desired gear reduction ratio between the transmission input shaft 24 and the input gear member 72.

Figure 4:
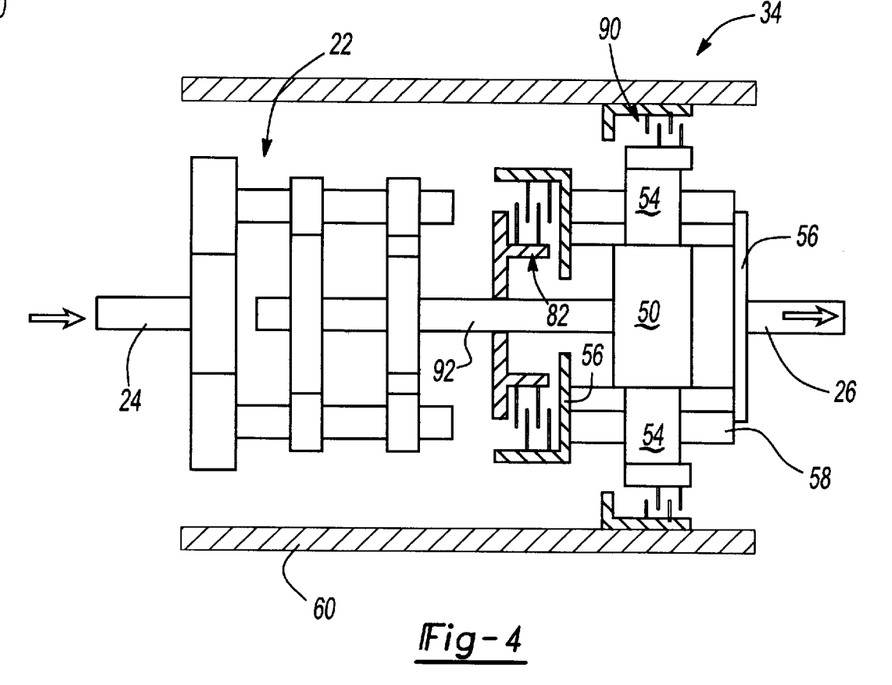
FIG. 4 illustrates a third embodiment of this invention.

FIG. 4 illustrates another embodiment of this invention. An engaging member 82, which is similar to that from FIG. 3, is utilized to lock the carrier member 56 to rotate with the sun gear 50. A separate engaging member 90 is selectively operated to ground the ring gear 52 to the housing 60. In this embodiment, the engaging members 82 and 90 preferably are wet clutches that are hydraulically activated through the controller 40.

A notable difference between the embodiment of FIG. 4 and those shown in FIGS. 2 and 3, for example, is that the planetary gear arrangement 34 is interposed between the transmission output shaft 26 the main gear box 22. In this embodiment, the engine output member 30 is directly coupled to the main gear box components. In this embodiment, the rotating shaft member 92 extends from the output of the main gear box 22 and is coupled directly with the sun gear 50. The planetary gear arrangement 34 then provides the selected gear reduction ratio between the shaft 92 and the output shaft 26 of the transmission system 20. In this embodiment, the carrier member 56 is coupled to rotate with the transmission output shaft 26.

Even in the example of FIG. 4, the planetary gear arrangement 34 and the flywheel member 33 cooperate as a variable inertia flywheel assembly. Even though the planetary gear arrangement 34 is not interposed between the transmission input shaft 24 and the main gear box 22, it is still effective to perform the functions of a traditional clutch and range gear box in the same manner as the examples described above.

The main advantage to an arrangement as shown in FIG. 4 is that the main gear box 22 need not be redesigned. When the planetary gear arrangement 34 is in interposed between the transmission input shaft 24 and the main gear box 22 (as shown is FIGS. 2 and 3, for example) modification of the main gear box components typically is needed to accommodate the higher torque levels available with the first gear reduction ratio provided by the planetary gear arrangement 34. At the same time, however, placing the planetary gear arrangement 34 at the end of the transmission as shown in FIG. 4, typically requires larger planetary gear members. This type of arrangement currently is believed to be most suitable for use in medium duty vehicles. Heavy duty vehicle applications likely will benefit mostly from having the planetary gear arrangement 34 in the position illustrated in FIGS. 2 and 3, for example. Those skilled in the art who have the benefit of this description will have the ability to choose the arrangement and placement of the components that is best suited for a particular situation.

Figure 5:
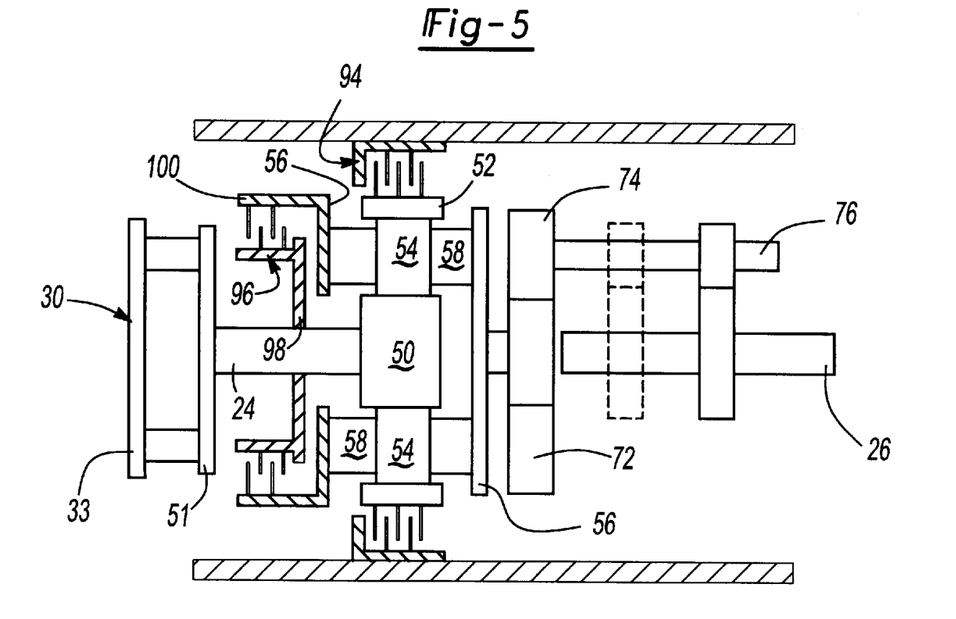
FIG. 5 illustrates a fourth embodiment of this invention.

FIG. 5 shows another embodiment where an engaging member 94 for grounding the ring gear 52 to the housing 60 is a wet clutch. The engaging member 94 is supported directly on the housing 60 and corresponding engaging components are supported on the ring gear 52, which eliminates the need for the extension 70 shown in other embodiments. An engaging member 96, which also preferably is a wet clutch, is used to lock the carrier member 56 to rotate with the ring gear 50 and the input shaft 24. The engaging member 96 is supported on a support member 98 and an extension 100 that is coupled with the carrier member 56. The operation of the arrangement of FIG. 5 is the same as that described with respect to FIG. 2, except for the difference in the positions and locations of the engaging members.

Figure 6:
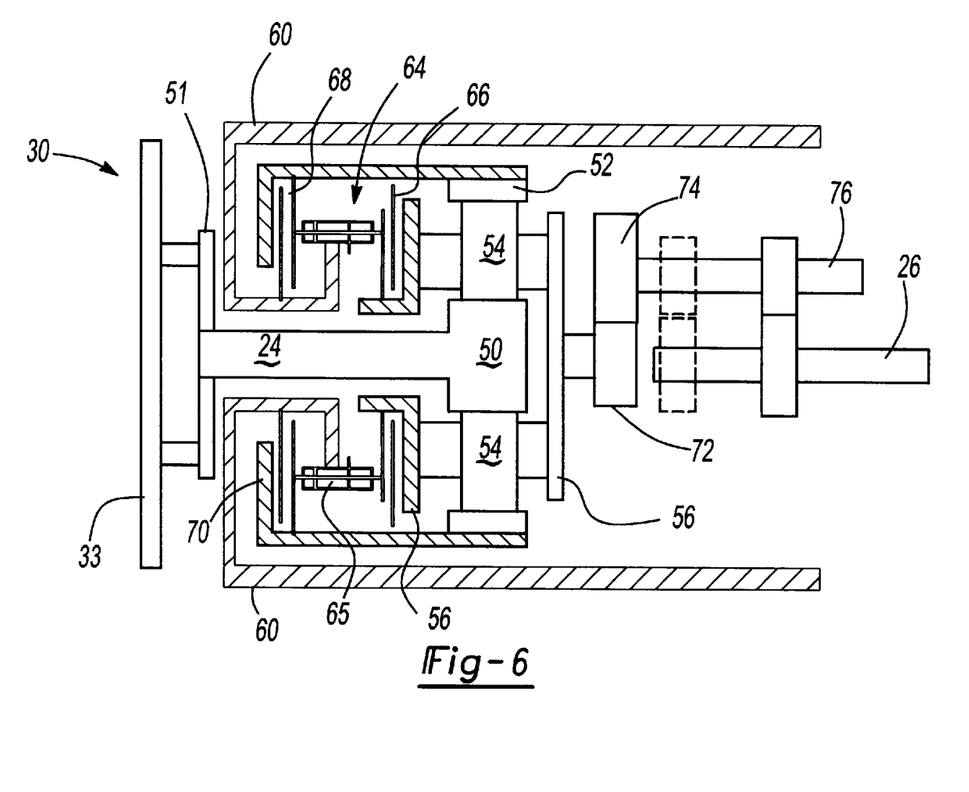
FIG. 6 illustrates a fifth embodiment of this invention.

FIG. 6 shows yet another example of a transmission system designed according to this invention. In this embodiment, the automated actuator 64 operates the clutch 68 to ground the ring gear 52 to the housing 60. The clutch 66 is utilized to lock the carrier member 56 to rotate with the ring gear 52 instead of with the sun gear 50 (as was done with the embodiment of FIG. 2). This embodiment has advantages compared to the embodiment of FIG. 2 in that the design and manufacture of the portions that support the clutch components of the clutches 66 and 68 are believed to be simpler to accomplish. Additionally, manufacturing the transmission with components arranged as schematically illustrated in FIG. 6 is believed to be more easily accomplished.

Figure 7:
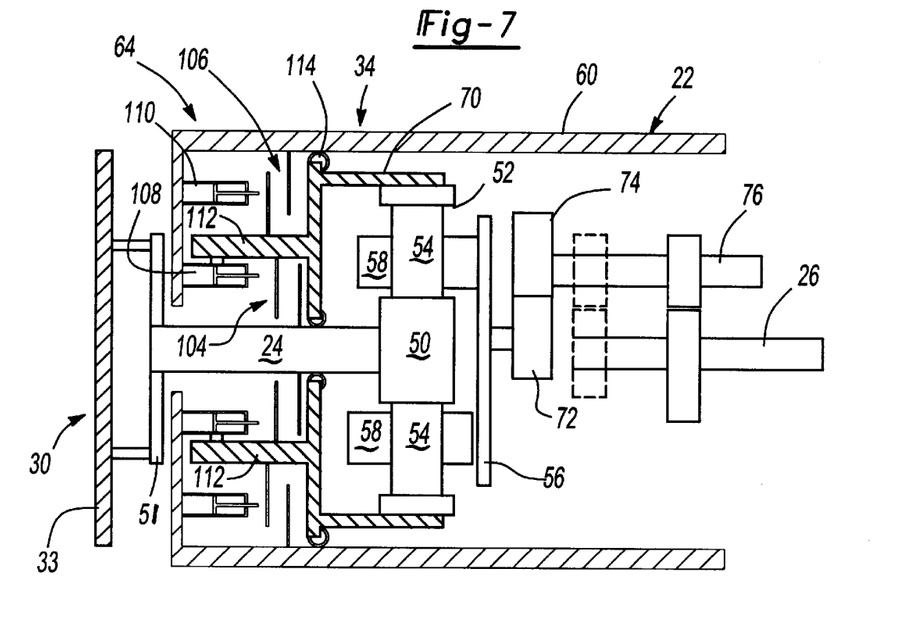
FIG. 7 illustrates a sixth embodiment of this invention.

FIG. 7 illustrates another embodiment where two dry clutches 104 and 106 serve as the engaging member. Independent actuator pistons 108 and 110 are controlled by the controller 40 to move the clutches 104 and 106 into and out of engaging positions, respectively. In this embodiment, a single support portion 112 supports at least one of the clutch plates of each of the clutches 104 and 106. The support portion 112 preferably is connected with the extension 70 from the ring gear 52. Selective activation of the actuators 108 and 110 either locks the ring gear 52 to the housing 60 or locks the carrier member 56 to rotate with the sun gear 50. Since dry clutches 104 and 106 are used, an oil seal 114 is provided to prevent transmission lubricants from contacting the clutch components.

Figure 8:
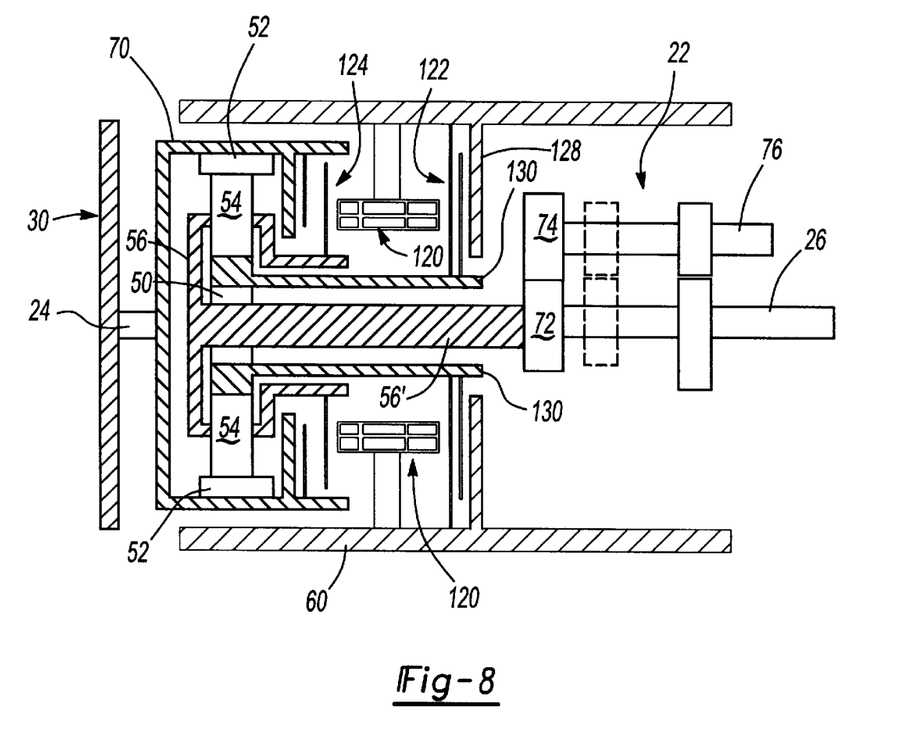
FIG. 8 illustrates a seventh embodiment of this invention.

FIG. 8 illustrates another example implementation of this invention. In this embodiment, the ring gear 52, rather than the sun gear 50, is the driving gear of the planetary gear arrangement 34. In this embodiment, the ring gear 52 and the transmission input shaft 24 are coupled to rotate together by the extension 70 from the ring gear 52. Coupling the ring gear 52 to the transmission input shaft 24 and, therefore, the engine output member 30, provides a different torque multiplication value at the first gear reduction ratio. In one example, the torque multiplication factor is approximately 1.5 (compared to 3 in the example arrangement of FIG. 2).

In this embodiment, an actuator 120 operates clutches 122 and 124 respectively. The actuator 120 preferably includes a moving piston as described above with respect to FIG. 2. The clutch 122 is engaged to ground the sun gear 50 to the housing 60. The clutch 122 cooperates with an extension 128 from the housing 60 and an extension 130 on the sun gear 50. When the sun gear 50 is grounded to the housing 60, the carrier member 56 and the pinion gears 54 rotate with the ring gear 52. A carrier extension 56 is coupled to the main gear box input gear 72 so that driving torque is provided to the main gear box and through the transmission output shaft 26 to the wheels of the vehicle.

The clutches 122 and 124 are both disengaged whenever it is desirable to place the transmission into neutral or to shift gears.

The clutch 124 is engaged to lock the carrier member 56 to rotate in unison with the ring gear 52. In this position, the planetary gear arrangement 34 provides a direct drive coupling between the engine output member 30 and the transmission main box input gear 72. This provides a high range of gear ratios.

Given this description, those skilled in the art will realize that a variety of variations in components, arrangement and coordination are possible. For example, the planetary gear arrangement 32 can be placed in "front" of the main gear box 22 or at the "rear" of the main gear box 22. Additionally, the carrier member 56 can be locked to rotate with the sun gear 50 or the ring gear 52, depending on which of those is directly coupled to rotate with the engine output 30. Additionally, the ring gear 52 and sun gear 50 can be locked to rotate in unison to achieve the high range of gear ratios.

The preceding description provides example arrangements designed according to this invention. Variations and modifications may become apparent to those skilled in the art that do not necessarily depart from the basis of this invention. The scope of legal protection given to this invention can only be determined by studying the following claims.

What is claimed is:

1. A vehicle driveline system, comprising:
   an engine having a rotating output member;
   an flywheel that rotates with the engine output member;
   a transmission main gear box having an input shaft, an output shaft and a plurality of gear members that are selectively engaged to provide a desired gear ratio between the input shaft and the output shaft;
   a planetary gear arrangement that is selectively moved into a first operating position to provide a first moment of inertia when a driving force from the engine output member is transmitted through the flywheel to the transmission input shaft and a second operating position to provide a second moment of inertia as the flywheel causes the transmission input shaft to rotate;
   an automated actuator that moves the planetary gear arrangement into a first operative position where the input shaft is coupled to the output shaft with a first gear reduction ratio, a second operative position where the input shaft is coupled to the output shaft with a second gear reduction ratio and a third operative position where no torque is transmitted from the input shaft to the output shaft; and
   a controller that determines when a driver intends to change from a current gear ratio to a desired gear ratio and the controller automatically controls the automated actuator to move the planetary gear arrangement into the third operative position.

2. The system of claim 1, including a damper having a first portion that rotates with the flywheel and a second portion that rotates with an input to the planetary gear arrangement.

3. The system of claim 2, wherein the second portion is damped.

4. The system of claim 1, wherein the planetary gear arrangement provides a first effective mass in the first operating position and a second effective mass in the second operating position.

5. The system of claim 1, wherein the first operating position is utilized when one of a plurality of lower gear ratios is selected and the second operating position is utilized when one of a plurality of higher gear ratios is selected.

6. The system of claim 1, wherein the planetary gear arrangement is positioned between the flywheel and the main gear box gear members.

7. The system of claim 1, wherein the planetary gear arrangement includes a sun gear, a ring gear, a plurality of pinion gears between the sun gear and the ring gear, and a carrier member that is coupled to the pinion gears and wherein one of the sun gear or the ring gear is coupled to the transmission input shaft to rotate with the input shaft and the other of the sun gear or the ring gear is selectively locked against rotation with the one gear in the first operative position or allowed to rotate with the one gear in the second operative position.

8. The system of claim 7, wherein the carrier member is coupled with the main gear members and wherein the carrier member rotates with the one gear to provide a first effective mass when the other gear is allowed to rotate with the one gear and the carrier member rotates with the one gear to provide a second effective mass when the other gear is locked against rotation with the one gear.

9. The system of claim 8, wherein the sun gear is fixed to rotate with the input shaft.

10. The system of claim 8, including a transmission housing and wherein the other gear is locked against rotation by being selectively coupled to the housing.

11. The system of claim 8, including an automated actuator that selectively locks the other gear against rotation with the one gear.

12. The system of claim 11, wherein the automated actuator selectively couples the carrier member to the one gear when the other gear is allowed to rotate with the one gear such that the carrier member rotates at the same speed as the input shaft.

13. The system of claim 1, wherein the planetary gear arrangement includes a first gear member fixed to rotate with the input shaft, a second gear member that generally surrounds the first gear member, a plurality of intermediate pinion gear members between and engaging the first and second gear members, and a carrier member that is associated with the pinion gear members.

14. The system of claim 13, including an automated actuator that selectively locks the second gear against rotation with the first gear member and that selectively couples the carrier member to the first gear member.

15. A vehicle dual mass flywheel assembly, comprising:
- a flywheel member that is adapted to be moved by a rotating engine output member;
- a planetary gear arrangement that is selectively moved into a first operative position where selected portions of the arrangement rotate with the flywheel member to provide a first moment of inertia, a second operative position where selected portions of the arrangement rotate with the flywheel member to provide a second moment of inertia and a third position where no portions of the arrangement rotate with the flywheel member; and
- a controller that determines when a driver intends to change from a current transmission gear ratio to a desired gear ratio and the controller automatically controls the planetary gear arrangement and moves the arrangement into the third position.

16. The assembly of claim 15, including a torsional damper between the flywheel member and the planetary gear arrangement.

17. The assembly of claim 15, including an automated actuator that selectively moves the planetary gear arrangement into the first, second or third operative positions.

18. The assembly of claim 15, including a damper having a first portion that rotates with the flywheel member and a second portion that rotates with an input to the planetary gear arrangement.

19. The assembly of claim 18, wherein the second portion is damped.

* * * * *